United States Patent
Wang et al.

(10) Patent No.: US 11,619,713 B2
(45) Date of Patent: Apr. 4, 2023

(54) LASER DETECTION AND RANGING DEVICE

(71) Applicant: LEISHEN INTELLIGENT SYSTEM CO. LTD., Shenzhen (CN)

(72) Inventors: Yong Wang, Shenzhen (CN); Xiaobo Hu, Shenzhen (CN); Peihua Duan, Shenzhen (CN)

(73) Assignee: LEISHEN INTELLIGENT SYSTEM CO. LTD., Shenzhen (CN)

( * ) Notice: Subject to any disclaimer, the term of this patent is extended or adjusted under 35 U.S.C. 154(b) by 1025 days.

(21) Appl. No.: 16/383,651

(22) Filed: Apr. 14, 2019

(65) Prior Publication Data

US 2019/0242982 A1    Aug. 8, 2019

Related U.S. Application Data

(63) Continuation-in-part of application No. PCT/CN2017/077765, filed on Mar. 22, 2017.

(30) Foreign Application Priority Data

Oct. 28, 2016   (CN) .......................... 201610972464.8

(51) Int. Cl.
| | |
|---|---|
| *G01S 7/481* | (2006.01) |
| *G01S 17/08* | (2006.01) |
| *G01S 17/06* | (2006.01) |
| *G02B 26/10* | (2006.01) |
| *G02B 5/00* | (2006.01) |
| *G02B 26/08* | (2006.01) |

(52) U.S. Cl.
CPC .......... *G01S 7/4817* (2013.01); *G01S 7/4816* (2013.01); *G01S 17/06* (2013.01); *G01S 17/08* (2013.01); *G02B 5/003* (2013.01); *G02B 26/0816* (2013.01); *G02B 26/10* (2013.01)

(58) Field of Classification Search
CPC ......... G01S 7/4817; G01S 17/06; G01S 17/08
See application file for complete search history.

(56) References Cited

U.S. PATENT DOCUMENTS

| | | | |
|---|---|---|---|
| 2007/0058230 A1* | 3/2007 | Blug | G02B 26/105 |
| | | | 250/234 |
| 2012/0249996 A1* | 10/2012 | Tanaka | G01S 17/42 |
| | | | 356/4.01 |
| 2013/0250302 A1* | 9/2013 | Kramer | G01S 7/497 |
| | | | 356/434 |
| 2016/0291134 A1* | 10/2016 | Droz | G01S 7/4817 |
| 2018/0011175 A1* | 1/2018 | Faetani | G01S 17/02 |

\* cited by examiner

*Primary Examiner* — Thanh Luu
(74) *Attorney, Agent, or Firm* — IPro, PLLC

(57) ABSTRACT

A laser detection and ranging (LADAR) device, including: a laser adapted to generate a laser emission path; an optical path scanning unit adapted to deflect the laser emission path and scan a target object using the laser emission path; a reflected light receiving unit coaxial to the laser emission path and adapted to receive a reflected light from the target object via the optical path scanning unit, and output an electric signal corresponding to the reflected light; a signal processing unit adapted to, according to the electric signal, generate distance information between the LADAR device and the target object, and process a plurality of acquired distance information, to yield position information of the target object; and a housing, including a filter disposed on the optical path of the optical path scanning unit.

13 Claims, 4 Drawing Sheets

LASER DETECTION AND RANGING DEVICE

CROSS-REFERENCE TO RELATED APPLICATIONS

This application is a continuation-in-part of International Patent Application No. PCT/CN2017/077765 with an international filing date of Mar. 22, 2017, designating the United States, and further claims foreign priority benefits to Chinese Patent Application No. 201610972464.8 filed Oct. 28, 2016. The contents of all of the aforementioned applications, including any intervening amendments thereto, are incorporated herein by reference.

BACKGROUND

This disclosure relates to a time-of-flight laser detection and ranging (LADAR) device.

LADAR devices are a surveying device that measures distance to an object by illuminating the object with pulsed laser light and measuring the reflected pulses with a sensor.

Conventionally, a laser rangefinder uses a laser beam to determine the distance to an object. The most common form of the laser rangefinder operates on the time-of-flight principle by sending a laser pulse in a narrow beam towards the object and measuring the time taken by the pulse to be reflected off the target and returned to the sender. Due to the high speed of light, this technique is not appropriate for high precision measurements, where triangulation technique is often used. When a triangulation method is using, a LADAR device requires having a slip ring, which adapts to drive the device to rotate so as to measure the distance between the objects and the LADAR device in different angles of view. The movement of rotation of slip ring tends to cause the functional surface of the LADAR device to degrade and increase the wear-rate, eventually lowering the durability of the LADAR device. In addition, the rotation of the slip ring involves a complex structure of optical paths, which impacts the production cost.

SUMMARY

Disclosed is a LADAR device that is cost-effective.

The disclosure provides a LADAR device, comprising:
a laser, the laser adapted to generate a laser emission path;
an optical path scanning unit, the optical path scanning unit adapted to: deflect the laser emission path, and scan a target object in a preset distance range using the laser emission path;
a reflected light receiving unit, the reflected light receiving unit being coaxial to the laser emission path and adapted to: receive a reflected light from the target object via the optical path scanning unit, and output an electric signal corresponding to the reflected light;
a signal processing unit, the signal processing unit adapted to, according to the electric signal, generate distance information between the LADAR device and the target object, and process a plurality of acquired distance information, to yield position information of the target object in the preset distance range; and
a housing, the housing adapting to accommodate the laser, the optical path scanning unit, the reflected light receiving unit, and the signal processing unit, and the housing comprising a filter disposed on an optical path of the optical path scanning unit.

The optical path scanning unit can comprise a light screen disposed on an optical axis of the laser emission path and adapted to shield stray light reflected from the filter.

The light screen can comprise a first end butting against an emitting outlet of the laser and a second end butting against the filter.

The optical path scanning unit can comprise a deflecting mirror and a rotating mechanism connected to the deflecting mirror and adapted to control rotation of the deflecting mirror.

The deflecting mirror can be a reflector or a prism.

The rotating mechanism can comprise a driving motor connected to the reflector or prism.

The rotating mechanism can comprise an encoder adapting to acquire data with regard to a rotation angle of the deflecting mirror.

The filter can be in the shape of a frustum of a cone; the frustum of a cone can comprise a chamber allowing the optical path scanning unit to rotate therein; and the chamber can comprise a light-absorbing unit adapted to absorb reflected light of the filter.

The filter can be in the shape of a reversed frustum of a cone; the reversed frustum of a cone can comprise a chamber allowing the optical path scanning unit to rotate therein; and the chamber can comprise a light-absorbing unit adapted to absorb reflected light of the filter.

The light-absorbing unit can be a groove comprising a light-absorbing surface, and the groove can be disposed on the reflective path of the reflected light of the filter.

The reflected light receiving unit can comprise a condenser adapting to converge reflected lights from the target object and a photodetector adapting to receive converged reflected lights by the condenser and output the electric signal.

The condenser can comprise a through hole disposed along the axis of the condenser and adapted to accommodate the laser.

The condenser can be an aspherical lens.

The light-absorbing unit can be a part of the inner wall of the chamber coated with a light-absorbing material.

The driving motor can be controlled by an external signal or a control signal of a control circuit of the RADAR device.

Advantages of the LADAR device as described in the disclosure are summarized as follows. The LADAR device involves no slip ring, has a relatively simple structure, relatively low wear rate, low production cost, and relatively long durability.

DETAILED DESCRIPTION

Figure 1:
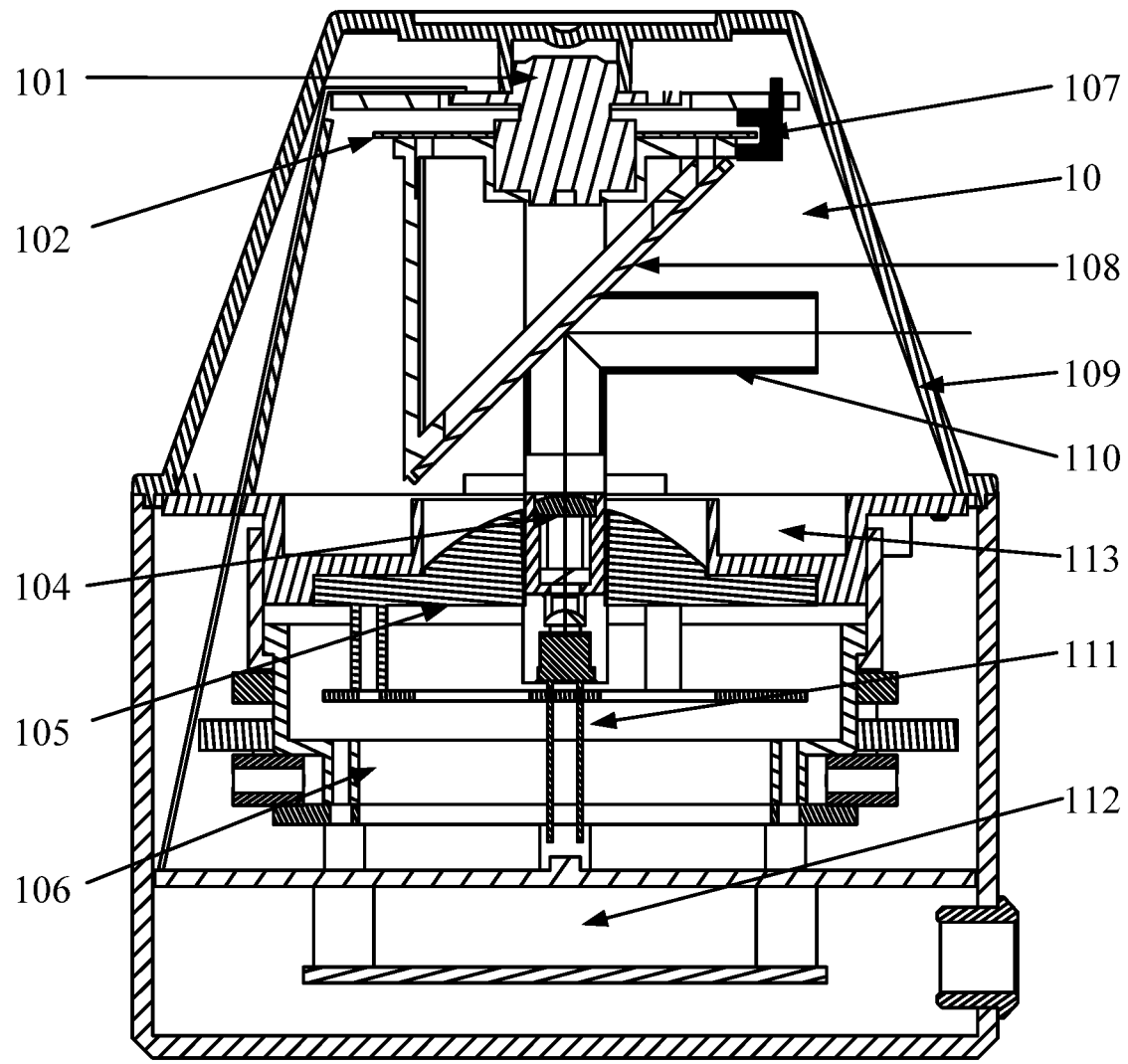
FIG. 1 is a sectional view of a LADAR device as described in the disclosure.
Figure 2:
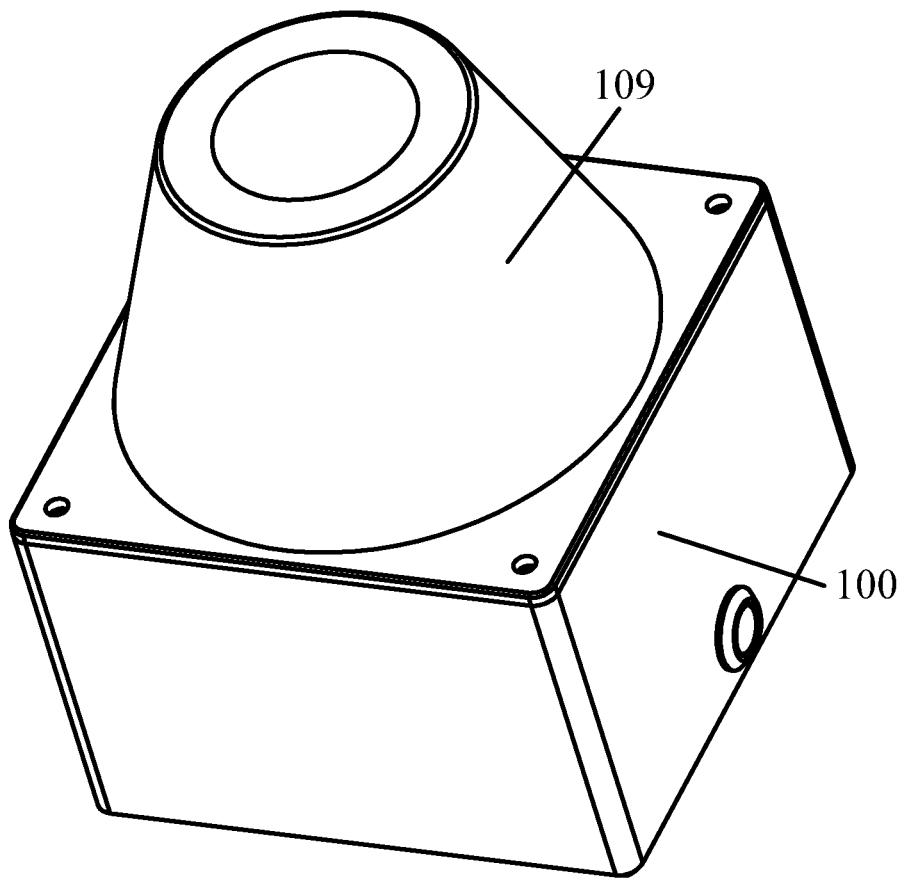
FIG. 2 is a stereogram of a LADAR device as described in the disclosure.

To further illustrate, embodiments detailing a LADAR device are described below. It should be noted that the following embodiments are intended to describe and not to limit the disclosure.

As shown in FIGS. 1-4, the disclosure provides a laser detection and ranging (LADAR) device based on time of flight. The LADAR device comprises: a laser 111, the laser adapted to generate a laser emission path; an optical path scanning unit 10, the optical path scanning unit adapted to: deflect the laser emission path, and scan a target object in a preset distance range using the laser emission path; a reflected light receiving unit, the reflected light receiving unit being coaxial to the laser emission path and adapted to: receive a reflected light from the target object via the optical path scanning unit 10, and output an electric signal corresponding to the reflected light; a signal processing unit 106, the signal processing unit adapted to, according to the electric signal, generate distance information between the LADAR device and the target object, and process a plurality of acquired distance information, to yield position information of the target object in the preset distance range; and a housing 100, the housing adapting to accommodate the laser 111, the optical path scanning unit 10, the reflected light receiving unit, and the signal processing unit, and the housing 100 comprising a filter 109 located between the optical path scanning unit and the target object.

The optical path scanning unit 10 comprises a light screen 110 disposed on an optical axis of the laser emission path and adapted to shield stray light reflected from the filter 109. The light screen 110 can reduce the scatter of the laser beam in the transmission process. Specifically, the light screen 110 comprises a first end butting against an emitting outlet of the laser 111 and a second end butting against the filter 109. The second end is tubular, for example, a cylindrical structure, or a square tubular structure. The approach of the light screen to the filter can reduce the reflection of the laser beam when penetrating the filter.

As an improvement, the optical path scanning unit 10 comprises a deflecting mirror 108 and a rotating mechanism connected to the deflecting mirror 108 and adapted to control rotation of the deflecting mirror 108. The deflecting mirror is a reflector or a prism. The selection of the reflector can simplify the optical path and reduce the loss in the optical path. The rotating mechanism comprises a driving motor 101 connected to the reflector or prism. The driving motor 101 may drive the reflector or prism to deflect by an acquired external signal or a control signal of a control circuit in the device.

The rotating mechanism of the optical path scanning unit 10 comprises an encoder 102 adapting to acquire data with regard to the rotation angle of the deflecting mirror. Specifically, the encoder 102 is a coding disk, which communicates with a photoelectric switch 107 through signal connection. The coding disk acquires the angle data, controls the photoelectric switch 107 to trigger the rotation of the driving motor 101, thus realizing the rotation scanning of the device. Optionally, the rotation of the driving motor 101 can be achieved through other means known to one of ordinary skill in the art, for example, a gear mechanism is employed to output the torque of the motor, and the rotation angle is controlled by the calculated velocity ratio.

Figure 3:
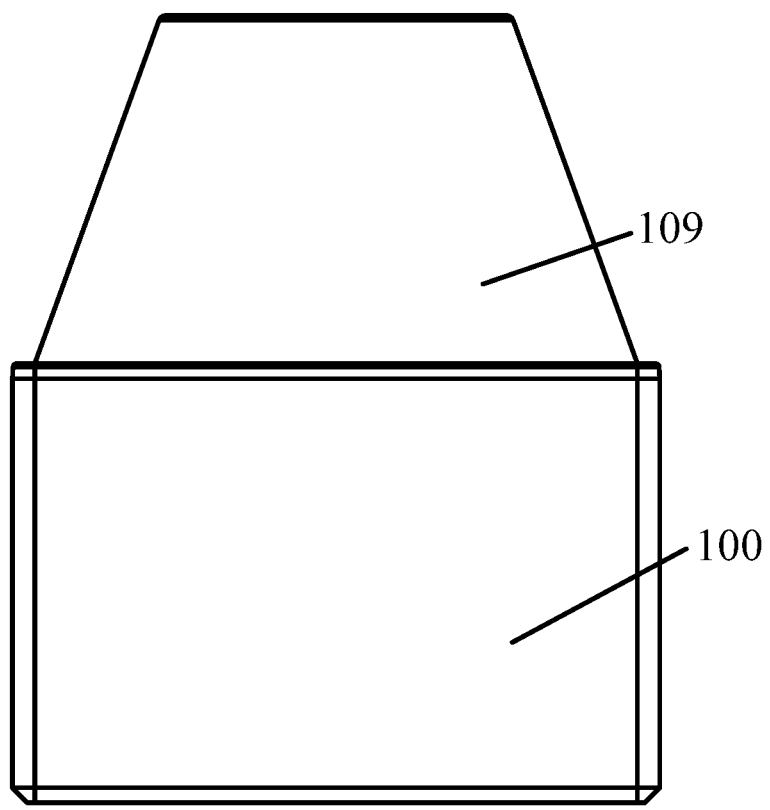
FIG. 3 is a side view of a LADAR device as described in the disclosure.

As shown in FIG. 3, the filter 109 is in the shape of a frustum of a cone with the upper surface diameter smaller than the lower surface diameter. The frustum of a cone comprises a chamber allowing the optical path scanning unit to rotate therein. The chamber comprises a light-absorbing unit 113 adapting to absorb reflected light of the filter 109. The light-absorbing unit is disposed on the bottom wall and/or other positions of the chamber covered by the reflection range of the filter 109. The light-absorbing unit 113 can be a normal structure coated with light-absorbing material to absorb the reflective stray light of the filter 109, preventing the stray light from adversely affecting the accuracy of the reflected light receiving unit.

Figure 4:
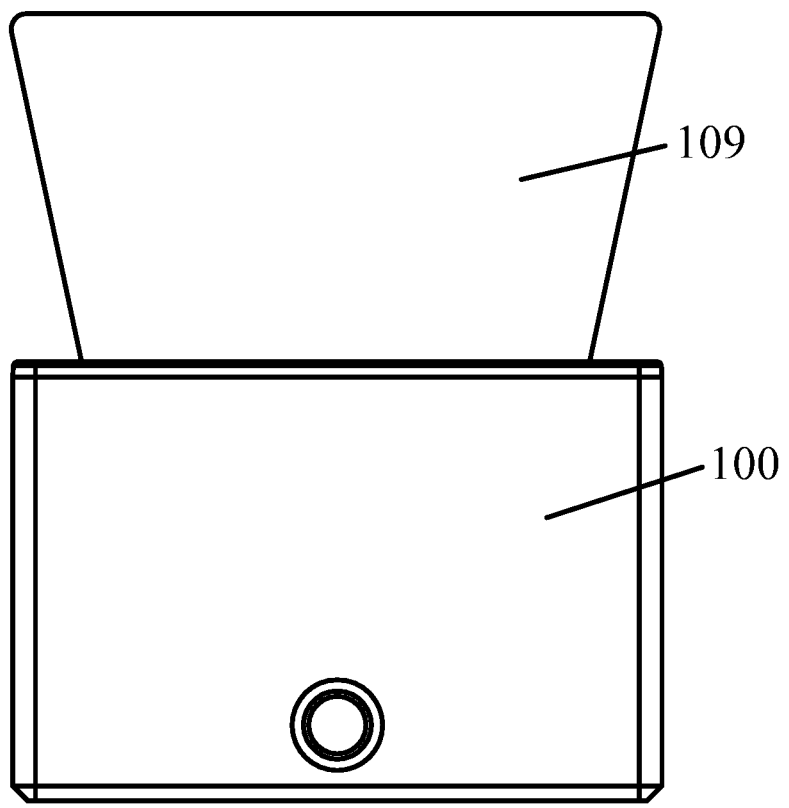
FIG. 4 is a side view of another LADAR device as described in the disclosure.

As shown in FIG. 4, the filter 109 is in the shape of a reversed frustum of a cone with the upper surface diameter greater than the lower surface diameter. The frustum of a cone comprises a chamber allowing the optical path scanning unit to rotate therein. The chamber comprises a light-absorbing unit 113 adapting to absorb reflected light of the filter 109. The light-absorbing unit is disposed on the top wall and/or other positions of the chamber covered by the reflection range of the filter 109. The light-absorbing unit can be a normal structure coated with light-absorbing material to absorb the reflective stray light of the filter 109, preventing the stray light from adversely affecting the accuracy of the reflected light receiving unit.

As an improvement, the light-absorbing unit is a groove 113 comprising a light-absorbing surface. The groove can be disposed on the bottom or top wall of the chamber. The light-absorbing surface is formed by materials with good light absorption ability. The groove is disposed on the reflective path of the reflected light of the filter. Undoubtedly, the light-absorbing unit can be any part of the chamber coated with a light-absorbing surface.

In this embodiment, the reflected light receiving unit comprises a condenser 104 adapting to converge reflected lights from the target object and a photodetector 112 adapting to receive the converged reflected lights by the condenser 104 and output the electric signal. The condenser 104 comprises a through hole disposed along the optical axis of the condenser. The laser is disposed on the optical axis of the condenser 104, which means the emission path of the laser is coaxial to the receiving path of the reflected light. In addition, the design can reduce the complexity of the laser radar optical system, greatly reduce the space occupied by the reflected light receiving unit, save the manufacturing cost and improve the production efficiency.

In this embodiment, the condenser 104 is an aspherical lens 105. The aspherical lens 105 can parallel output the converged lights, improving the quality of light transmission, and meanwhile improving the sensitivity of the photodetector 112, increasing the effective measurement distance of the LADAR device. The aspherical lens 105 can be made of plastic material, which is beneficial to reducing weight and saving cost.

The LADAR device as described in the disclosure and the distance information provided thereby can be used as navigation information. Therefore, the LADAR device can be applied to various systems. For example, the LADAR device as described in the disclosure can be used on vehicles such as unmanned cars, bicycles, wheelchairs, and the like to provide distance information. By taking advantage of the characteristics of high accuracy, wide measurement range, and low delay of the LADAR, the vehicles can accurately and timely acquire the position information in the process of automatic navigation, thus greatly enhancing the vehicle's automatic navigation performance.

In this embodiment, no slip ring is involved. The emission path of the laser light is deflected and controlled by using the optical path scanning unit, no need to deflect the entire LADAR device. Specifically, as descried in the disclosure, the driving motor of the optical path scanning unit drives the deflecting mirror to rotate and illuminate the laser light on the target object in different angles, without the involvement of the slip ring as taught in conventional laser radar. This greatly simplifies the product structure, reduces the wear loss of the entire device, and prolongs the service life of the LADAR device. In addition, the reflected light receiving unit is coaxial to the laser emission path, further simplifying the emission and receiving path of the laser light, and reducing the production cost of the LADAR device.

It will be obvious to those skilled in the art that changes and modifications may be made, and therefore, the aim in the appended claims is to cover all such changes and modifications.

What is claimed is:

1. A laser detection and ranging (LADAR) device, comprising:
   a laser, the laser adapting to generate a laser emission path;
   an optical path scanning unit, the optical path scanning unit adapting to: deflect the laser emission path, and scan a target object in a preset distance range using the laser emission path;
   a reflected light receiving unit, the reflected light receiving unit being coaxial to the laser emission path and adapting to: receive a reflected light from the target object via the optical path scanning unit, and output an electric signal corresponding to the reflected light;
   a signal processing unit, the signal processing unit adapting to, according to the electric signal, generate distance information between the LADAR device and the target object, and process a plurality of acquired distance information, to yield position information of the target object in the preset distance range; and
   a housing, the housing adapting to accommodate the laser, the optical path scanning unit, the reflected light receiving unit, and the signal processing unit, and the housing comprising a filter disposed on an optical path of the optical path scanning unit;
   wherein
   the filter is in the shape of a frustum of a cone, the frustum of a cone comprises a chamber allowing the optical path scanning unit to rotate therein, the chamber comprises a light-absorbing unit adapting to absorb reflected light of the filter, the light-absorbing unit is a groove comprising a light-absorbing surface, and the groove is disposed on a reflective path of the reflected light of the filter.

2. The device of claim 1, wherein the optical path scanning unit comprises a deflecting mirror and a rotating mechanism connected to the deflecting mirror and adapting to control rotation of the deflecting mirror.

3. The device of claim 2, wherein the deflecting mirror is a reflector or a prism.

4. The device of claim 3, wherein the rotating mechanism comprises a driving motor connected to the reflector or prism.

5. The device of claim 4, wherein the driving motor is controlled by an external signal or a control signal of a control circuit of the LADAR device.

6. The device of claim 2, wherein the rotating mechanism comprises an encoder adapting to acquire data with regard to a rotation angle of the deflecting mirror.

7. A laser detection and ranging (LADAR) device, comprising:
   a laser, the laser adapting to generate a laser emission path;
   an optical path scanning unit, the optical path scanning unit adapting to: deflect the laser emission path, and scan a target object in a preset distance range using the laser emission path;
   a reflected light receiving unit, the reflected light receiving unit being coaxial to the laser emission path and adapting to: receive a reflected light from the target object via the optical path scanning unit, and output an electric signal corresponding to the reflected light;
   a signal processing unit, the signal processing unit adapting to, according to the electric signal, generate distance information between the LADAR device and the target object, and process a plurality of acquired distance information, to yield position information of the target object in the preset distance range; and
   a housing, the housing adapting to accommodate the laser, the optical path scanning unit, the reflected light receiving unit, and the signal processing unit, and the housing comprising a filter disposed on an optical path of the optical path scanning unit;
   wherein the filter is in the shape of a reversed frustum of a cone, the reversed frustum of a cone comprises a chamber allowing the optical path scanning unit to rotate therein, the chamber comprises a light-absorbing unit adapting to absorb reflected light of the filter, the light-absorbing unit is a groove comprising a light-absorbing surface, and the groove is disposed on a reflective path of the reflected light of the filter.

8. A LADAR device, comprising:
   a laser, the laser adapting to generate a laser emission path;
   an optical path scanning unit, the optical path scanning unit adapting to: deflect the laser emission path, and scan a target object in a preset distance range using the laser emission path;
   a reflected light receiving unit, the reflected light receiving unit being coaxial to the laser emission path and adapting to: receive a reflected light from the target object via the optical path scanning unit, and output an electric signal corresponding to the reflected light;
   a signal processing unit, the signal processing unit adapting to, according to the electric signal, generate distance information between the LADAR device and the target object, and process a plurality of acquired distance information, to yield position information of the target object in the preset distance range; and
   a housing, the housing adapting to accommodate the laser, the optical path scanning unit, the reflected light receiving unit, and the signal processing unit, and the housing comprising a filter disposed on an optical path of the optical path scanning unit;
   wherein the optical path scanning unit comprises a light screen disposed on an optical axis of the laser emission path and adapting to shield stray light reflected from the filter, and the light screen comprises a first end butting against an emitting outlet of the laser and a second end butting against the filter.

9. The device of claim 8, wherein the reflected light receiving unit comprises a condenser adapting to converge reflected lights from the target object and a photodetector adapting to receive converged reflected lights by the condenser and output the electric signal, the condenser comprises a through hole disposed along an axis of the condenser and adapting to accommodate the laser.

10. The device of claim 8, wherein the filter is in the shape of a frustum of a cone; the frustum of a cone comprises a chamber allowing the optical path scanning unit to rotate therein; and the chamber comprises a light-absorbing unit adapting to absorb reflected light of the filter.

11. The device of claim 10, wherein the light-absorbing unit is a part of an inner wall of the chamber coated with a light-absorbing material.

12. The device of claim 8, wherein the filter is in the shape of a reversed frustum of a cone; the reversed frustum of a cone comprises a chamber allowing the optical path scanning unit to rotate therein; and the chamber comprises a light-absorbing unit adapting to absorb reflected light of the filter.

13. The device of claim 12, wherein the light-absorbing unit is a part of an inner wall of the chamber coated with a light-absorbing material.

\* \* \* \* \*